June 26, 1945.   H. G. KLEMM ET AL   2,378,933
APPARATUS FOR PHOTOGRAPHIC PRINTING
Original Filed April 6, 1940   10 Sheets-Sheet 1
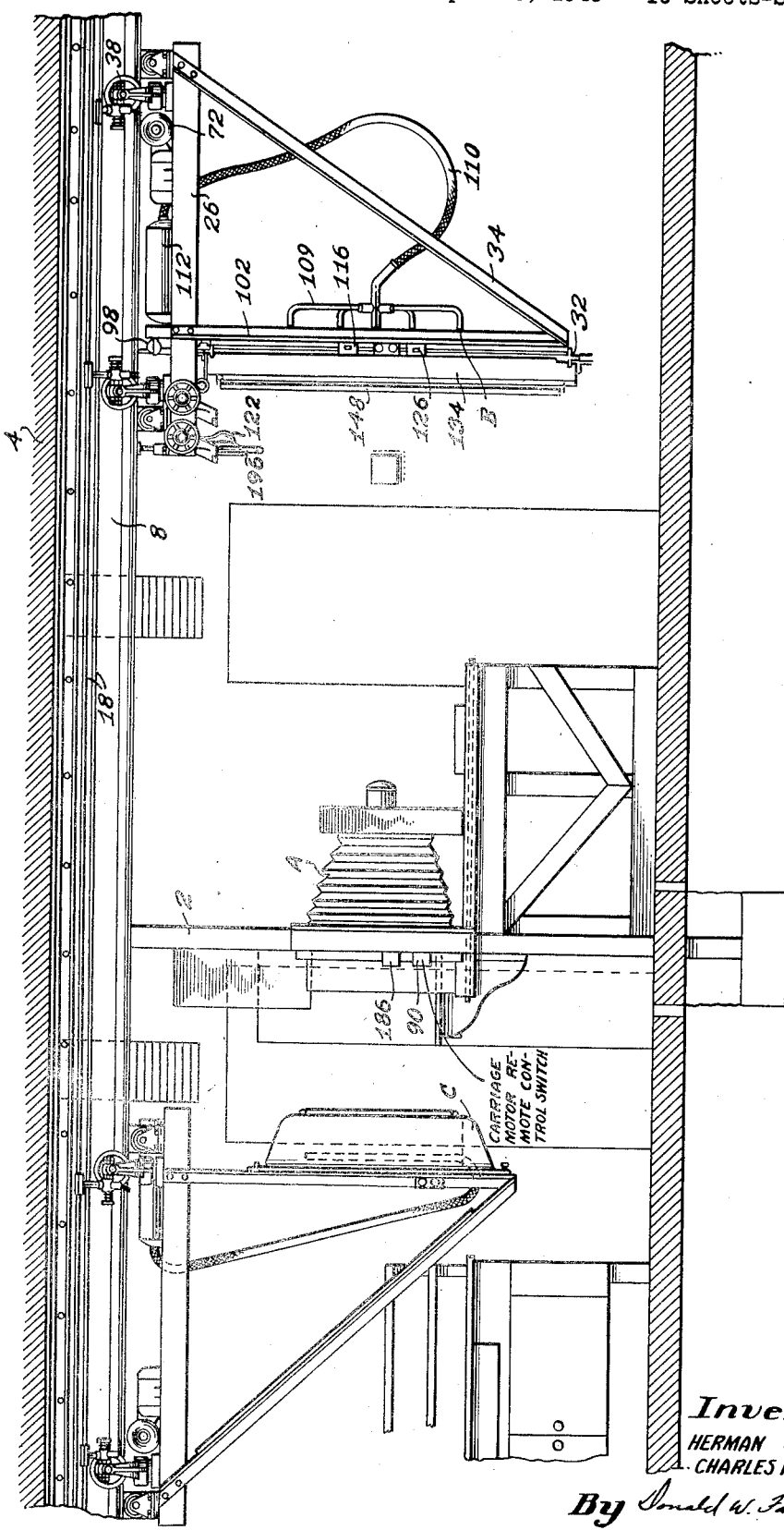
Inventors
HERMAN G. KLEMM
CHARLES H. NILES
By Donald W. Farrington
Attorney

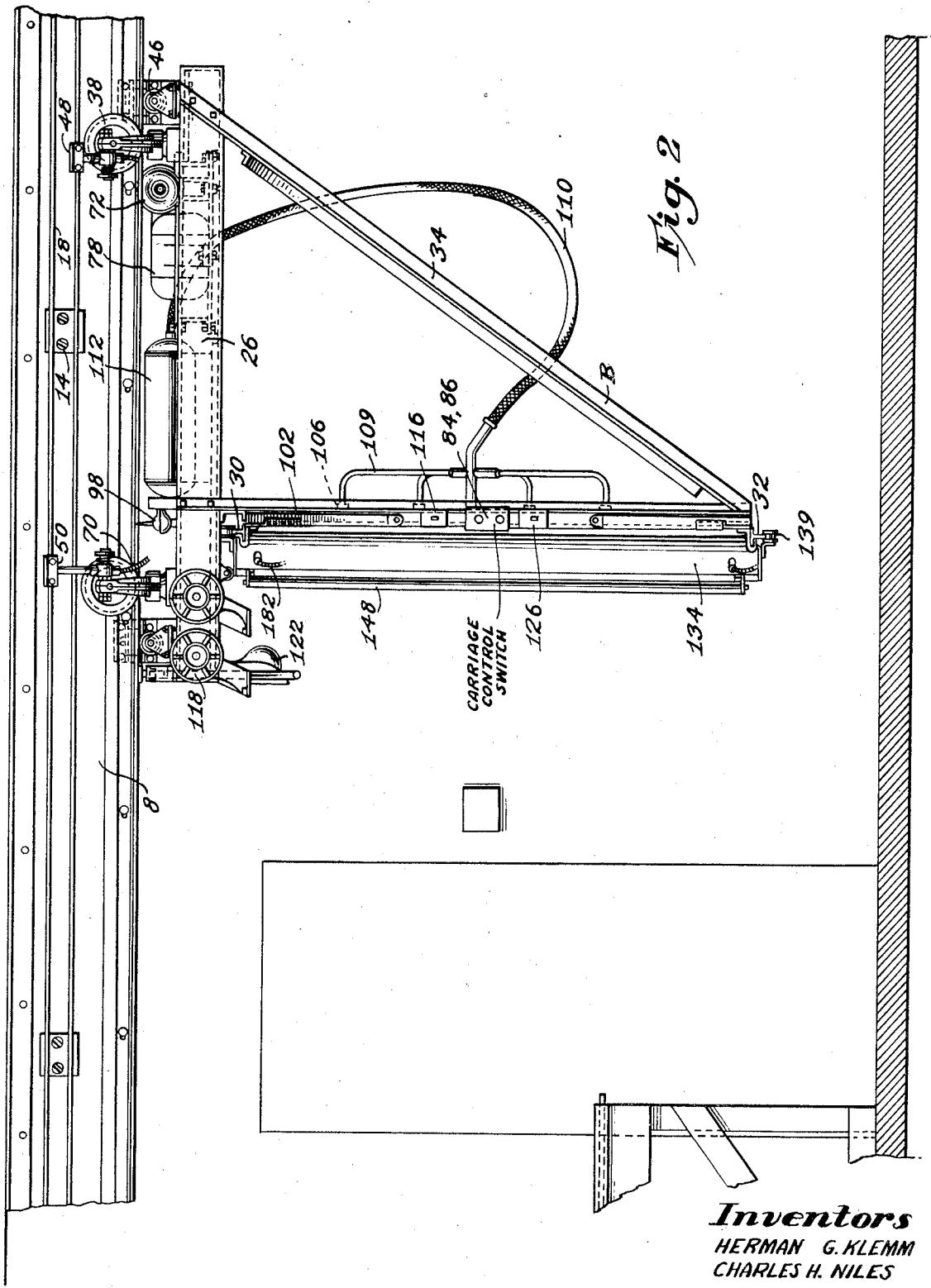

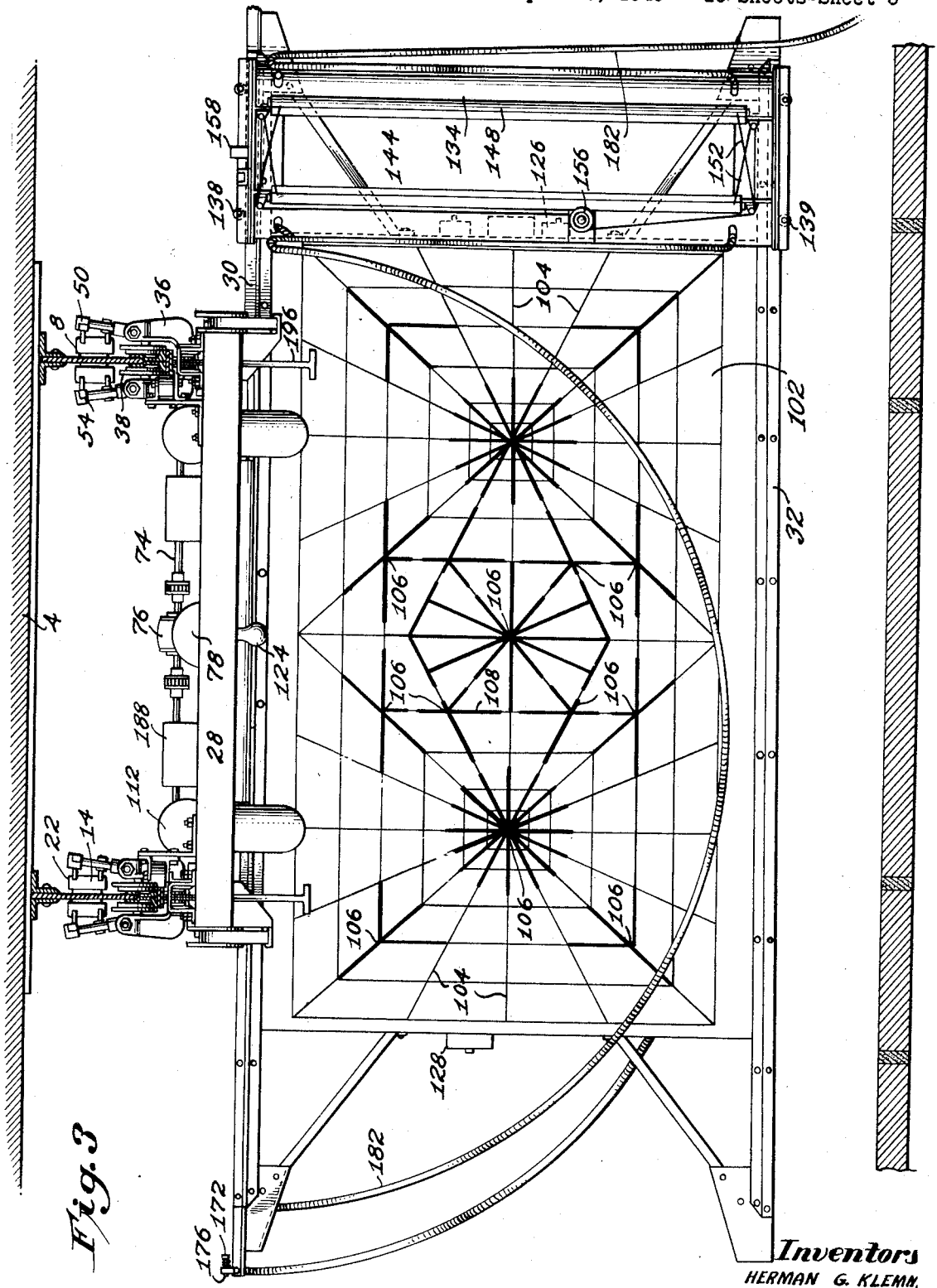

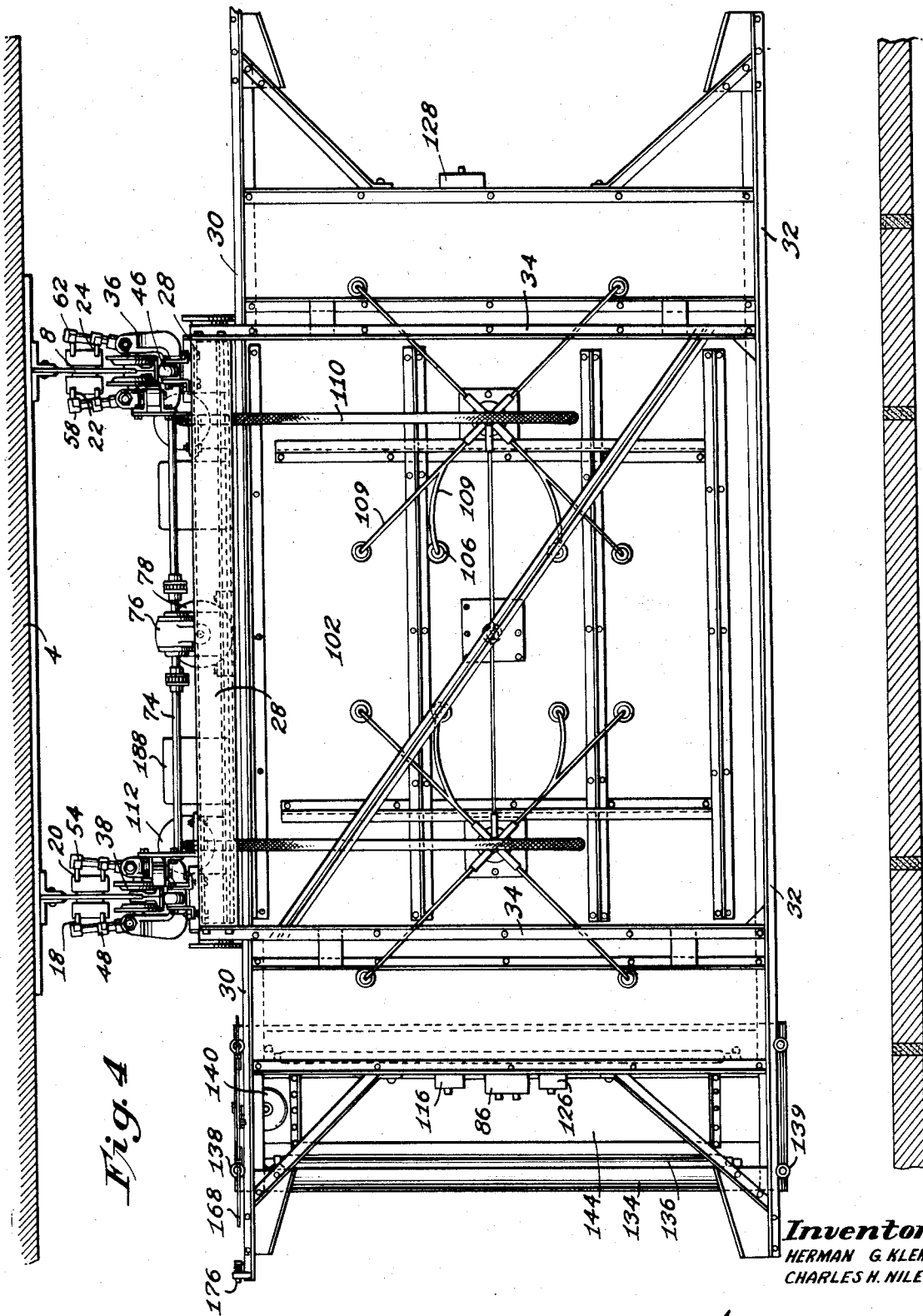

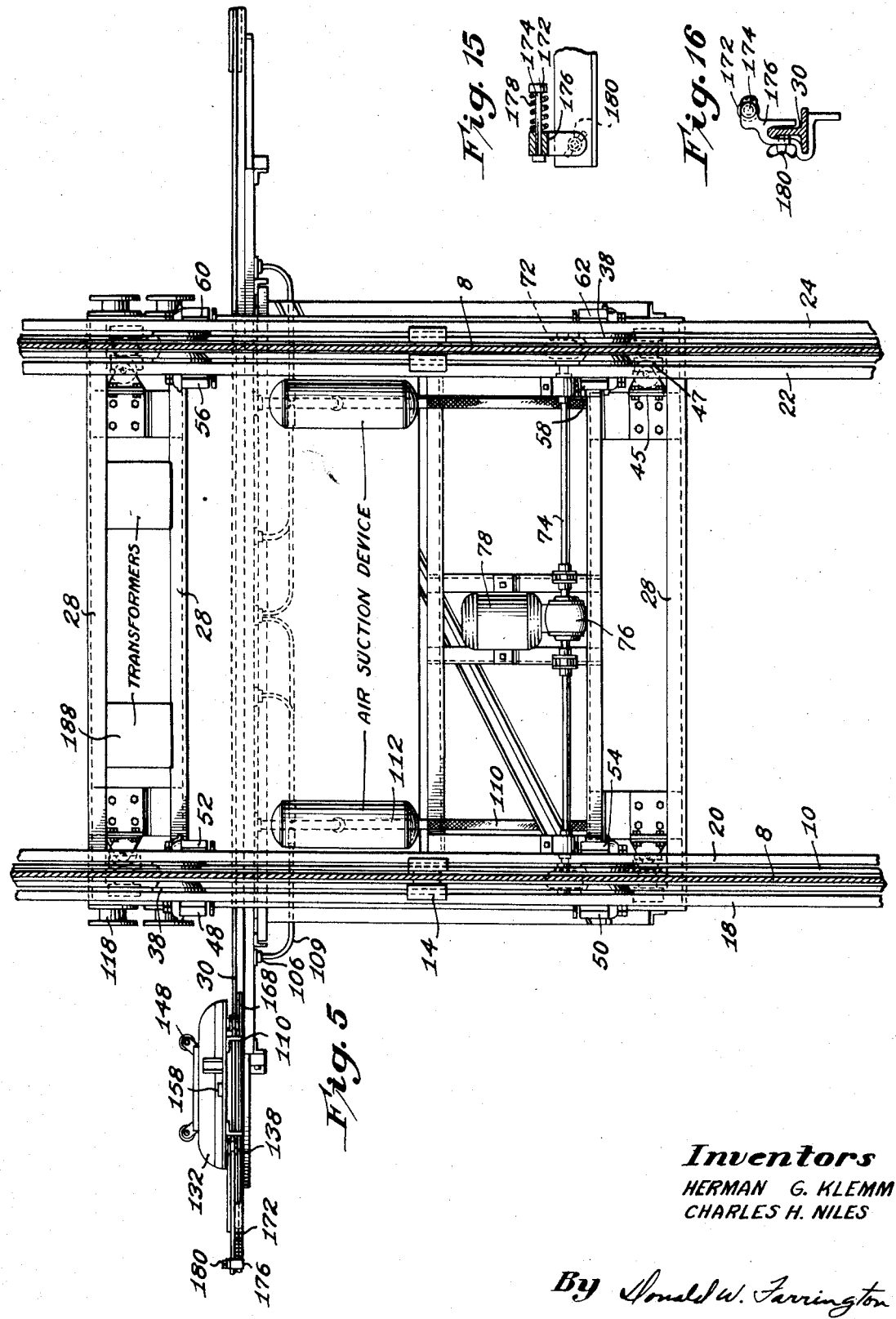

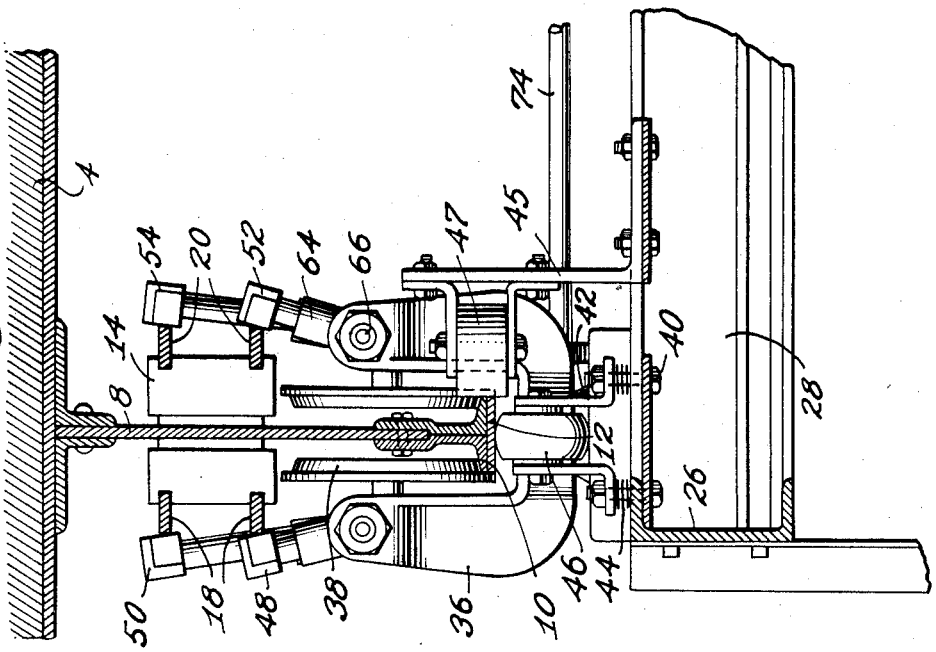
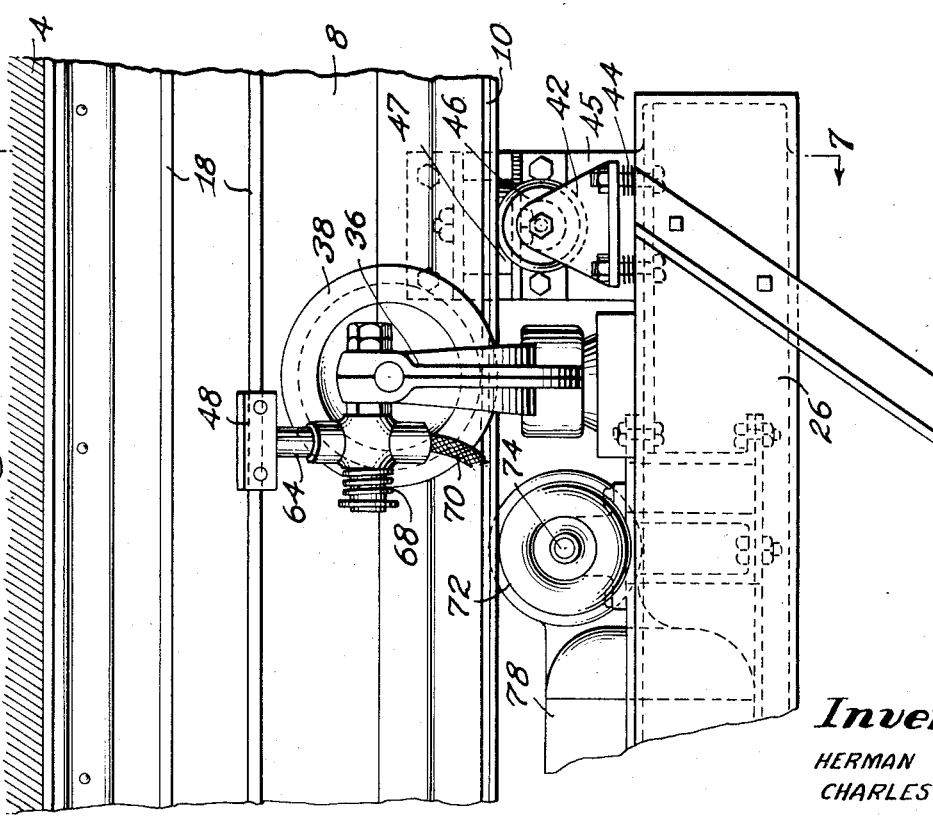

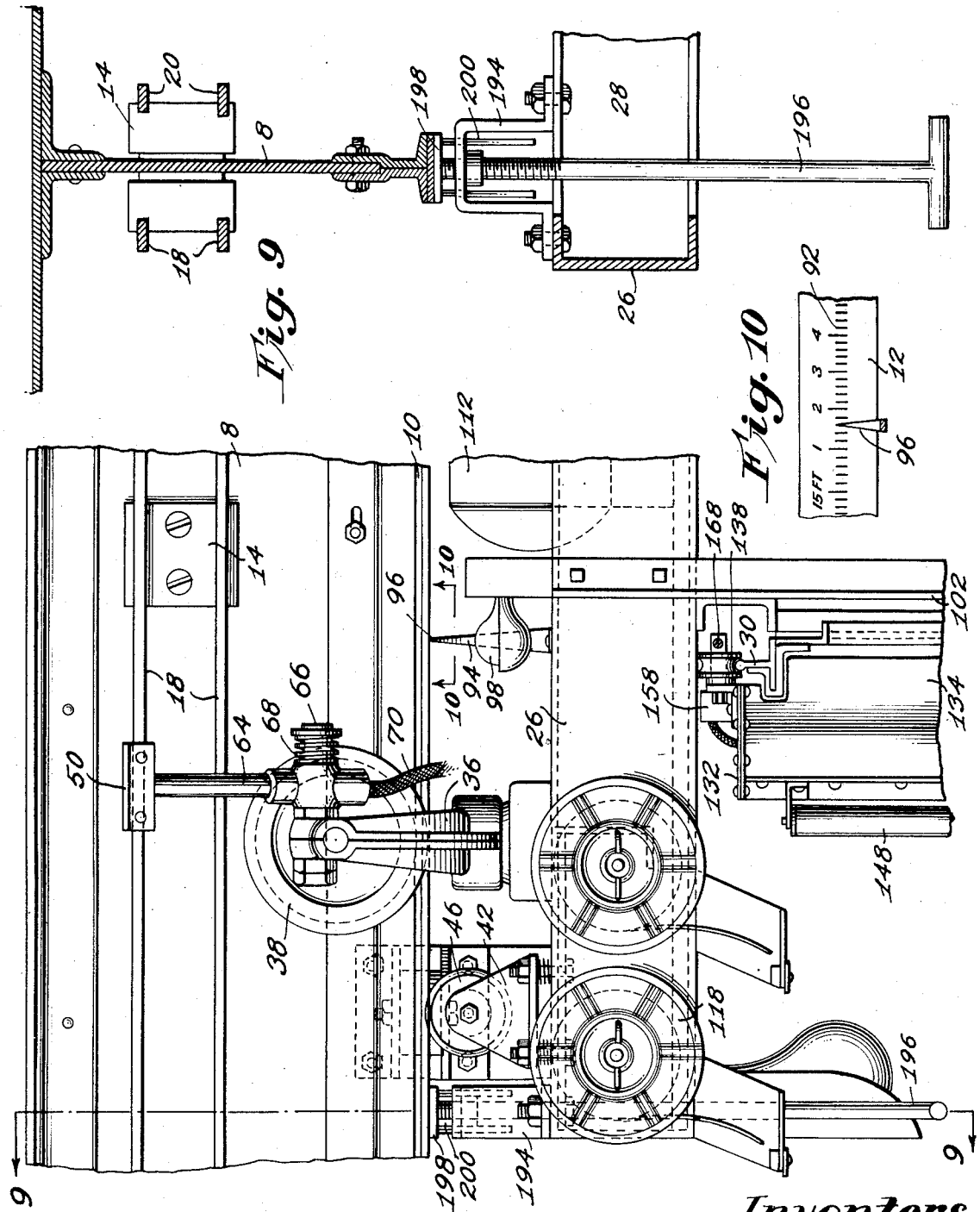

June 26, 1945.  H. G. KLEMM ET AL  2,378,933
APPARATUS FOR PHOTOGRAPHIC PRINTING
Original Filed April 6, 1940    10 Sheets-Sheet 8
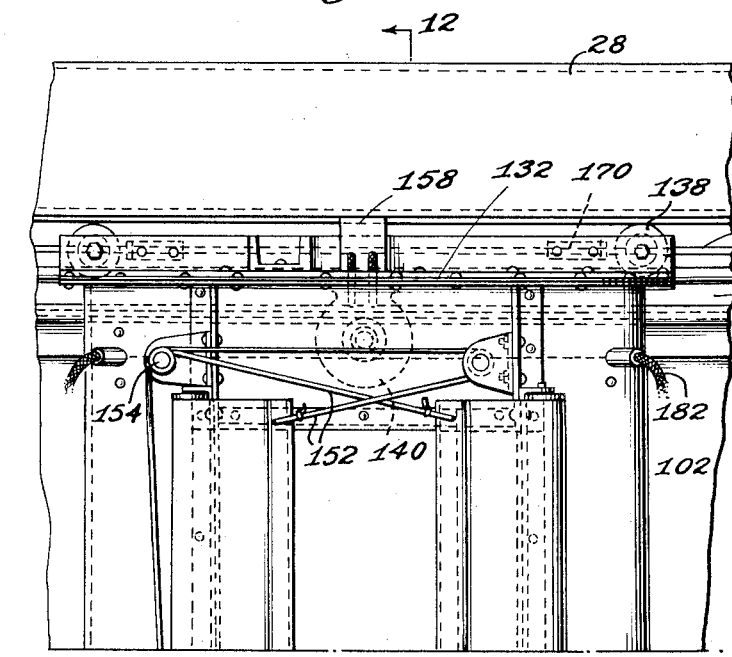
Fig. 11
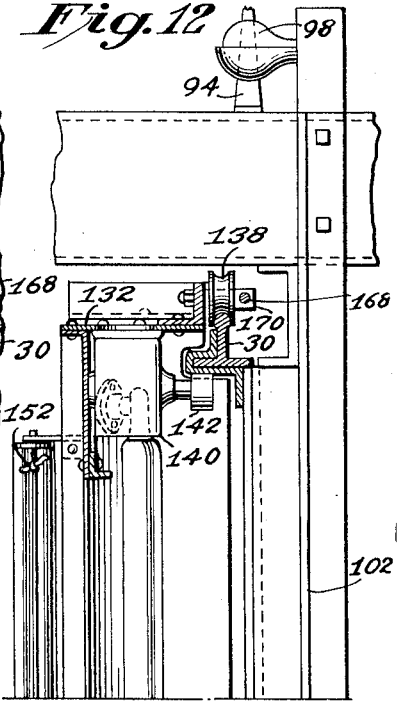
Fig. 12
*Inventors*
HERMAN G. KLEMM
CHARLES H. NILES
By Donald W. Farrington
*Attorney*
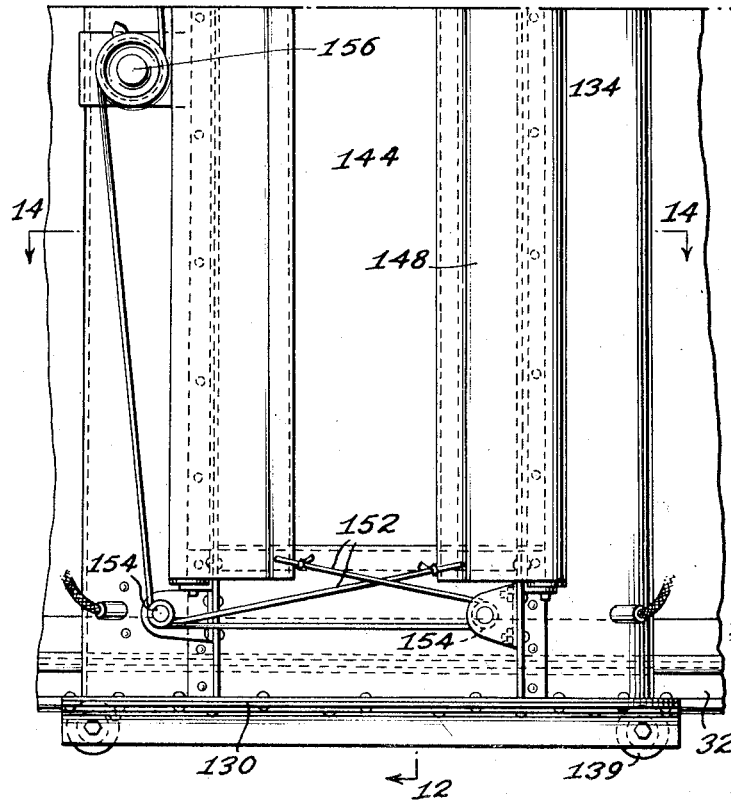
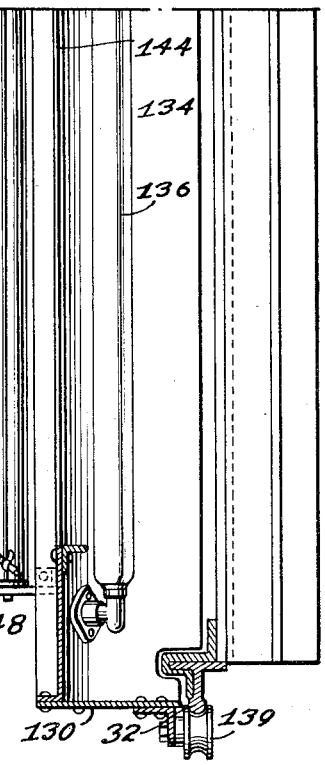

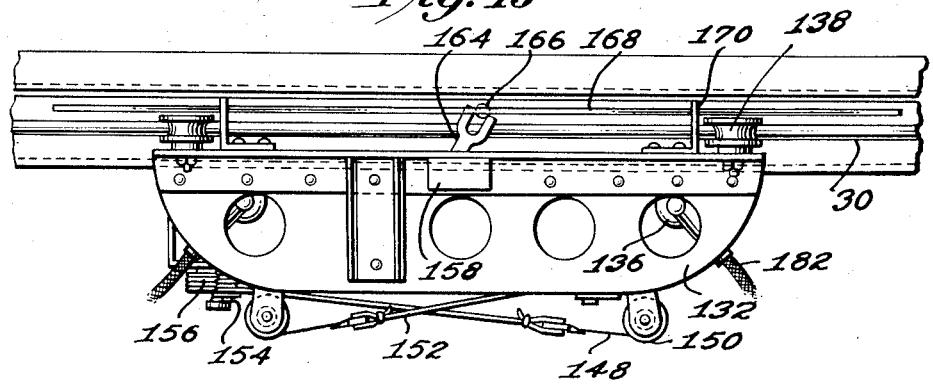
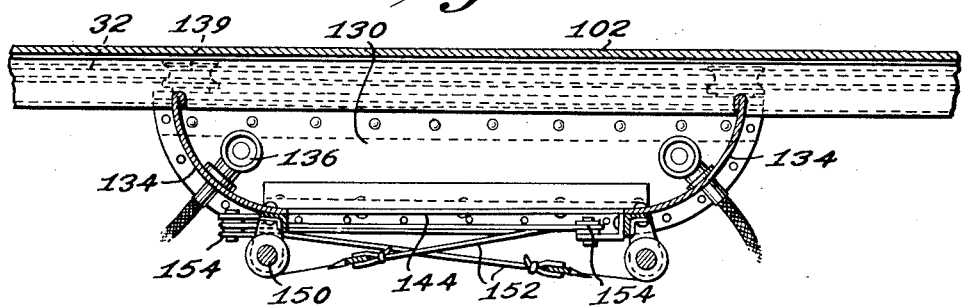
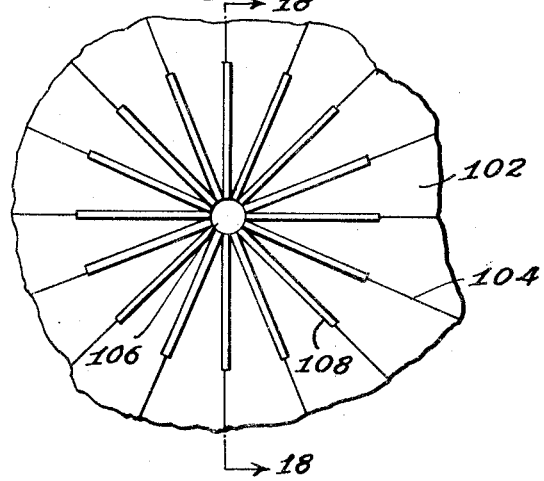
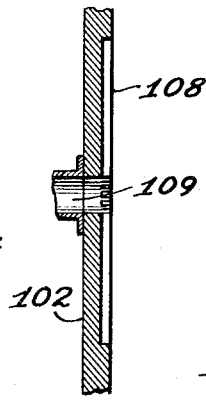
Inventors
HERMAN G. KLEMM
CHARLES H. NILES

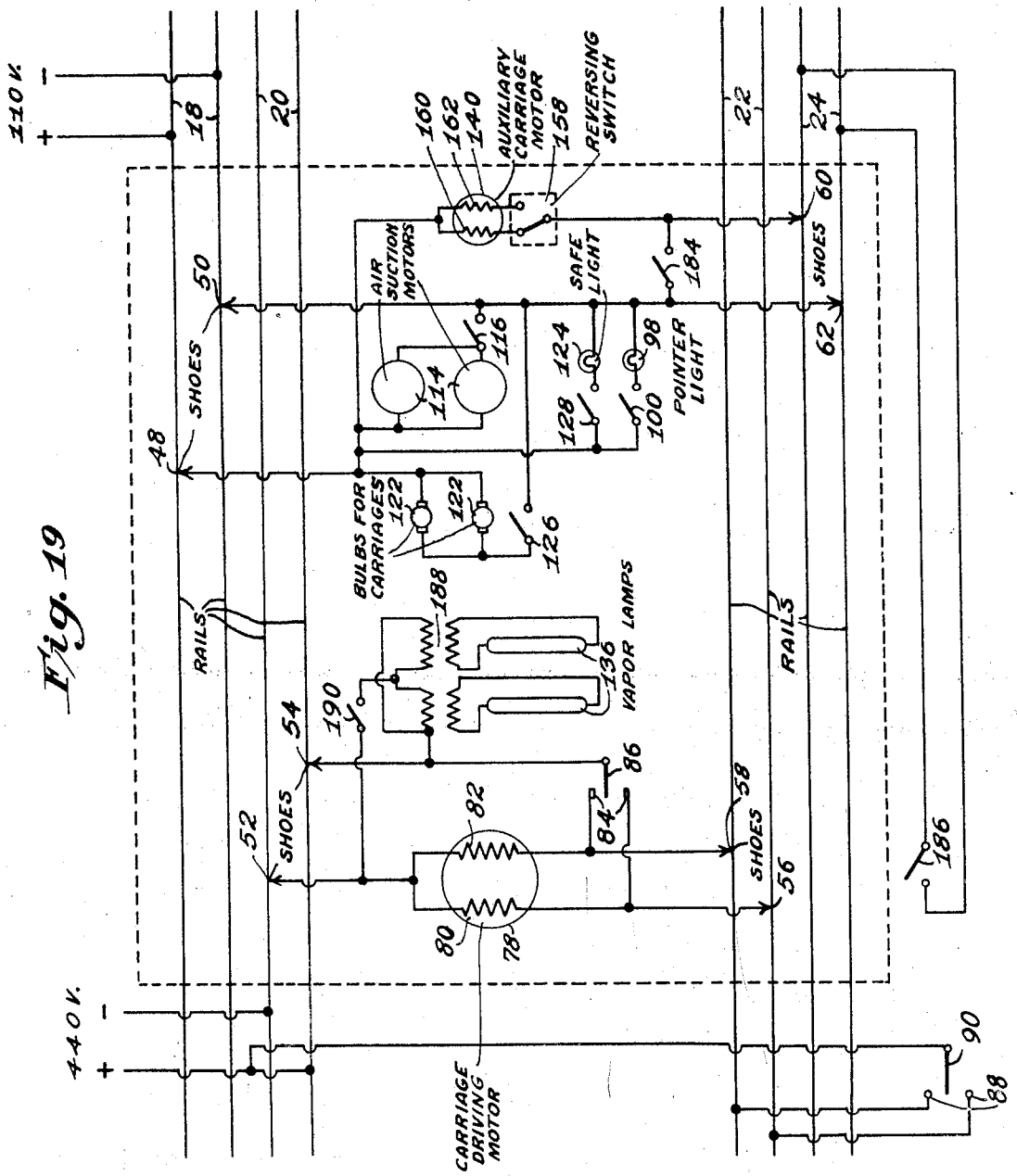

Patented June 26, 1945

2,378,933

UNITED STATES PATENT OFFICE

2,378,933

APPARATUS FOR PHOTOGRAPHIC PRINTING

Herman G. Klemm, Towson, and Charles H. Niles, Baltimore, Md., assignors to The Glenn L. Martin Company, Middle River, Md., a corporation of Maryland Original application April 6, 1940, Serial No. 328,224. Divided and this application November 3, 1942, Serial No. 464,330

6 Claims. (Cl. 88—24)

This invention relates to photographic apparatus, and particularly to apparatus designed for the making of copies of engineering drawings, although the device is useful for many other purposes.

The invention is a division of application serial No. 328,224, filed April 6, 1940.

The primary object of the invention is to provide a mechanism for properly supporting and illuminating any photographic subject, whether a flat member such as a drawing of which a photograph is to be taken or a sensitized flat member, which mechanism is adjustable as desired to vary the distance between the camera or projector and the subject.

Another object of the invention is to provide a novel means for supporting flat articles on a movable support, in the path of a photographic apparatus.

Still another object of the invention is to provide a mechanism which permits desired enlargement or reduction in the dimensions of a photographic subject.

A further object of the invention is to provide a novel illuminating mechanism for a photographic subject which is mounted on a support, this mechanism operating in a panoramic fashion.

A further object of the invention is to provide a novel mechanism for illuminating an object to be photographed, in such a manner that is easy to adjust the degree of exposure. More particularly, this feature of the invention contemplates a panoramic arrangement by which the dimensions of that portion of the subject exposed or illuminated at any one time may be varied, while by varying the number of passages of the light across the subject the degree of exposure can also be regulated.

Further objects and advantages of the invention may be seen from the following description, particularly when taken in conjunction with the accompanying drawings which form a part thereof.

In the drawings:

Fig. 1 shows in side elevation an assembly embodying the invention, the carriage which forms the principal feature of the invention being shown at the right of this figure;

Fig. 2 is an enlarged view similar to Fig. 1 of the carriage itself;

Fig. 3 is a front view thereof;

Fig. 4 is a rear view thereof;

Fig. 5 is a top plan view thereof;

Fig. 6 is a detailed side elevation of the rear wheels of the carriage;

Fig. 7 is a cross-section on the line 7—7 of Fig. 6;

Fig. 8 is a detailed side elevation of the front wheels of the carriage;

Fig. 9 is a detailed cross-section on the line 9—9 of Fig. 8;

Fig. 10 is a detailed cross-section on the line 10—10 of Fig. 8;

Fig. 11 is a front elevation of the auxiliary carriage;

Fig. 12 is a cross-section on the line 12—12 of Fig. 11;

Fig. 13 is a top plan view of Fig. 11;

Fig. 14 is a cross-section on the line 14—14 of Fig. 11;

Fig. 15 is a detailed front elevation partly in section of one of the adjustable motor reversing stops;

Fig. 16 is a side elevation thereof;

Fig. 17 is a detail of a portion of the panel of the carriage in front view;

Fig. 18 is a cross-section on the line 18—18 of Fig. 17, and

Fig. 19 is a wiring diagram of the apparatus.

The apparatus as shown embodies primarily a camera A, a movable carriage B which forms the essential feature of the invention, and a second carriage C. Carriages B and C are arranged in two rooms separated by a wall 2, through which the camera A extends.

The invention is to be used primarily in one of the following manners. In the first use, an article to be copied, for example, a photographic subject such as a mechanical drawing made on a sheet of painted metal as disclosed in our application executed herewith, is placed on the carriage B. A photograph of this is taken by the camera A, in a manner to be described below, or larger negatives may be made on carriage C.

In the other use, a sensitized element, for example an element of the type described in the copending application, is placed on the carriage B, then a negative is placed in the camera A and projected by a light carried by carriage C onto the sensitive plate.

The details of the camera A, and of the carriage C except insofar as it is similar to the carriage B, need not be described. The present application involves primarily the structure and operation of the carriage B.

Carried by the ceiling 4 or supported in any other suitable manner are a pair of parallel tracks. These tracks as shown for example in Fig. 7 each include a web portion 8 connected to the ceiling 4 and lower flanges 10 having a flat bottom surface 12. Carried by each of the tracks 6, by insulating blocks 14, are four pairs of conducting rails, indicated at 18, 20, 22, and 24 for each pair respectively.

The carriage is formed of a framework having side bars 26 parallel to the rails 6, and cross pieces 28. At its front end the carriage supports upper and lower transversely extending frame and guide members 30 and 32 respectively, the lower guide member 32 being braced by an angle member 34.

The connection between the carriage and the tracks is shown in detail in Figs. 6 to 8. The mounting of the rear wheels is shown in Figs. 6 and 7. Upstanding from the carriage frame are arms 36 on opposite sides of the web portion 8 of the track, and rotatably mounted in these arms are flanged wheels 38 which run on the flanges 10, the flanges of the wheels engaging the edges of flanges 10.

Also carried by the frame beneath the rails are four pairs of bolts 40. Slidably mounted on the upper ends of these bolts are pairs of triangular frame members 42, which are held upward resiliently away from the frame by coil springs 44 surrounding the bolts and located between the frame members 42 and the frame of the carriage. Rotatably mounted in each pair of members 42 is a pneumatic wheel 46 which engages the lower face 12 of the rail. The wheel or tire 46 is thus pressed resiliently against the lower surface of the rail.

Fig. 8 shows the front mounting, which corresponds to the rear mounting. It includes two upright arms 36 mounting the wheels 38, and the frame members 42 mounting the rubber tire 46.

The carriage frame further carries inside the rail uprights 45 in which are rotatably mounted rollers 47 engaging the inside edges of flanges 10.

Current from the rail pairs 18, 20, 22 and 24 is taken off by shoes 48, 50; 52, 54; 56, 58 and 60, 62 respectively. Each of these shoes is carried by one of the upstanding arms 36, being mounted thereon by an arm 64 pivoted on a pin 66 and urged inwardly to cause the shoes to engage the rail by a coil spring 68. It will be noted that the arms 64 on the rear wheel carrying members are shorter than those on the front, so as to engage the lower rails. Current connection is made from the shoes to the various devices located on the carriage by flexible cables 70 conductively connected to the shoes.

The carriage is thus mounted for movement in the direction of the rails. Such movement is produced by rubber tired wheels 72 (Fig. 6) driven through shafts 74 and gearing 76 by an electric motor 78 (Fig. 5). Motor 78 is of the reversible type having two coils 80 and 82 which when energized cause the motor to turn in opposite directions (Fig. 19). Coils 80 and 82 at one end are electrically connected together, and are connected through shoe 52 to one of the rails 20, the two rails 20 being connected to a source of current of fairly high tension, for example 440 volts. The other terminals of coils 80 and 82 are connected respectively to shoe 56 and 58, and thus to rails 22. These terminals are also connected respectively to the spaced contacts 84 of a two-way switch 86 which in turn is connected to shoe 54 engaging the other of the rails 20.

Rails 22, on the other hand, are connected to the terminals 88 of a two-way switch 90, the blade of which is in turn connected to the same side of the 440 volt current source as the shoe 54.

The switch 84, 86 is preferably mounted on the carriage itself and is manually operable. In this connection it should be noted that the broken line outline in Fig. 19 encloses those parts of the mechanism which are carried by the carriage, and indicate as well portions of the rails, whereas all parts not within this broken line outline are located off the carriage. The switch 88, 90 is preferably located as indicated on the left-hand side of wall 2 (Fig. 1), so that the position of the carriage may be controlled from the room behind the camera.

It is obvious that by shifting switch 86 to engage one or the other of contacts 84, current will flow through one of the coils 80 or 82 and the motor will be driven in the desired direction. The same effect may be obtained by moving switch blade 90 to engage one of the contacts 88.

In order to indicate the position of the carriage, or the distance of the front face of the panel thereof, which is to be described below, from the camera, the lower face 12 of one of the rails 6 is provided with a scale 92 (see Fig. 10). Mounted on the carriage frame is a pointer 94 having a portion bent over as at 96 opposite the scale 92. The reading of the pointer may be examined at any time by means of a light bulb 98 located on the carriage and shielded from below, but positioned so as to illuminate the tip 96 of the pointer 94. Lamp 98 may be controlled by a suitable switch 100 mounted on the carriage, and receiving current through shoes 48 and 50 and rails 18 from a suitable 110 volt source of current connected to the rails 18.

The upper and lower cross frame members 30 and 32 support between them a large flat panel 102. This panel is provided on its surface with a series of vertical, horizontal and diagonal lines, indicated for example at 104 (Fig. 3). One purpose of these lines is to aid in the centering of a photographic subject on the panel. The panel is also provided with a plurality of apertures 106 therethrough, the positions of these apertures being indicated in Fig. 3. From each aperture, and preferably in partial coincidence with lines 104, extend grooves 108 in the face of the panel 102. The arrangement of these grooves is indicated by the heavy lines on the face of the panel in Fig. 3.

The openings 106 are connected at the back of the panel by suitable pipes 109 to a manifold consisting of a flexible hose 110. One of these hoses is provided on each side of the machine, and they are connected to suitable air suction devices 112, of the type of the ordinary vacuum cleaner, for example. Air suction devices 112 are operated by motors 114 which are supplied with current by shoes 48 and 50 from rails 18, and are controlld by a switch 116 mounted on the carriage.

When a flat article is to be held on the panel 102, the switch 116 is closed and the motors of the air suction devices are started. This causes air to be sucked through all of the holes 106. If now a flat article is placed on the face of panel 102, it will overlie some of the holes 106 and the corresponding grooves 108, the grooves will distribute the lower pressure over the back of the subject, and the normal atmospheric pressure on the front will cause the subject to adhere securely in position on the panel.

If the subject is not sufficiently flat to adhere closely enough to the surface of the panel to prevent the escape of air around its edges, and thus to maintain the suction, the edges may be sealed for example with an adhesive masking tape taken from reels 118 mounted on the front of the carriage in a convenient location.

The front panel 102 may be suitably illuminated for ordinary manipulation by a pair of light bulbs 122 carried on the front cross member 28, or by a safe light 124 also mounted on the front cross member. Bulbs 122 and safe light 124 are connected through switches 126 and 128 respectively, mounted on the carriage, to shoes 48 and 50 and thus to the rails 18 and the source of 110 volt current. It is thus possible by closing the switches to illuminates the panel with either source of light.

In order to illuminate a drawing carried by the panel 102, the panoramic arrangement shown in particular in Figs. 11 to 16 is provided.

This is composed of an auxiliary carriage formed by a bottom wall 130, a top wall 132 and vertical walls 134. Vertical walls 134 as shown in Fig. 14 are of parabolic form, to act as reflectors for vertically arranged illuminating members, such as mercury vapor tubes, 136. These tubes thus illuminate the surface of the panel behind the auxiliary carriage but are shielded from the camera.

The auxiliary carriage is mounted for movement across the face of the panel by wheels 138, 139 engaging the upper and lower edges of the cross guides 30 and 32 respectively. Movement of the carriage is produced by a motor 140 mounted in the top thereof and driving a wheel 142 which engages a portion of the lower surface of the top cross guide 30. It is obvious that by rotation of the motor in one direction or the other the auxiliary carriage will travel in one direction or the other across the face of the panel.

The side members 134 are spaced apart to provide an exposure gap 144 therebetween. It is desirable to be able to regulate the width of this gap. This is accomplished by curtains 148 of flexible but opaque material, which are mounted on opposite sides of the space 144 on vertically arranged ordinary spring rollers 150. Cables 152 connected to the rollers and passing over idling rollers 154 are all led to a drum 156 mounted on one of the side members 134. The cables are so arranged, as shown in the drawings, that when drum 156 is turned in one direction both curtains are pulled towards each other, while when it is turned in the other direction the curtains are allowed to move apart under the action of their spring rollers 150. The position of drum 156 is suitably controlled by giving it a frictional mounting having sufficient friction to overcome the tension of the spring rolls 150.

It is obvious that by turning the drum 156 in one direction or the other the distance between the curtains may be varied.

Likewise mounted on the carriage 129 is a reversing switch 158 which has its two terminals connected to the coils 160 and 162 respectively of the motor 140 which drives the auxiliary carriage. The blade of this reversing switch is operated by a lever 164 (Fig. 13) having a fork engageable with a pin 166 carried by a rod 168 longitudinally slidable in frames 170 carried by the top portion 132 of the auxiliary carriage, this rod being located behind the wheels 138. Rod 168 is so mounted that, as it moves with the auxiliary carriage, at each end of its path it will engage a head 172 of a pin 174 slidably mounted in a bracket 176 and urged towards the center of the panel by a coil spring 178 (Figs. 15 and 16). Bracket 176 is adjustably fixed on the top edge of top cross guide 30 by a suitable set screw 180. It is apparent that as the carriage moves towards each end of its path, the rod 168 will cause a reversal of the switch, and thus cause the carriage to travel back towards its original position. By adjusting the position of the stop mechanism 176, the travel of the carriage can be varied.

Current is supplied to the auxiliary carriage, both for the vapor tubes 136 and for the reversing switch 158 and motor 142, through flexible cables 182 which hang down from the ends of cross guide 30 and thus may follow the auxiliary carriage in its transverse movement. The cables 182 carry all of the different lines necessary for the operation of the auxiliary carriage.

Motor 140 may be operated through a switch 184 mounted on the carriage and through which one or the other of the motor coils 160, 162 is connected through shoes 48 and 50 and rails 18 to the 110 volt source of current. The motor may also be controlled, however, by a switch 186 located off the carriage, and preferably adjacent the switch 88, 90 for the main carriage motor 78. Opposite terminals of switch 186 are connected to rails 24, which in turn are connected through shoes 62 and 50 to one rail 18, and through shoe 60 to reversing switch 68 and thus to the auxiliary carriage motor. Thus when the switch 186 is closed the auxiliary carriage will be forced to move back and forth across the face of the auxiliary panel.

The vapor lamps 136 are operated by transformers 188 having their primary coils connected through a switch 190 to shoes 52 and 54. By closing switch 190 transformers 188 are thus connected to the 440 volt source, and the lamps 136 are illuminated.

The carriage may be held in any position by the mechanism shown in Figs. 8 and 9. A frame 194 carried by the carriage frame has threaded therein a downwardly extending handle 196, provided at its upper end with a shoe 198 guided against turning movement by downwardly extending pins 200 slidable in frame 194. By turning handle 196 shoe 198 may be pushed upwardly against the bottom of the rail 6, so as to lock the carriage in any given position.

In use, if a photograph is to be made of a subject carried by the carriage, the switch 116 is closed and the article is properly positioned on the front of the panel 102, where it will be held in position by the suction of the motors 114. The operator then examines the subject through the camera A, and adjusts the focus of the camera, or the position of the carriage by switch 90, until the desired size and sharpness of image is obtained. The lights 122, 124 may be used for this purpose. Thereafter, lights 122, 124 are extinguished and a sensitive plate is placed in the camera.

The flexible curtains 148 are first adjusted to expose the desired portion of the subject at any one time. The switch 190 is then closed so as to energize the vapor tubes 136. The switch 186 is now closed, and the auxiliary carriage begins to move across the front of the panel over the subject. As the carriage moves across, it passes over the subject and thus illuminates it.

When the carriage reaches a position determined by the position of the stop mechanism 176, the switch 158 is reversed, and the carriage moves back until it reaches the other end of its travel determined by the position of a second stop. Obviously the number of passages of the illuminating mechanism across the subject may be controlled by the switch 186, so that any desired degree of illumination and of exposure of each portion of the subject and the plate in the camera A can be obtained.

If a negative of greater size than can be produced in the camera A is desired, a sensitive plate may be carried by the carriage C, and supported thereon by suction in the same manner as for the carriage B.

If now a copy is to be made of a negative, the negative may be placed in the camera A and illuminated through means carried by carriage C, or a negative carried by carriage C may be projected onto the panel 102. The carriage may then be adjusted until the desired focus and proportion are reached. The carriage is then stopped, and the sensitive plate is placed on the panel and held thereon by suction. The safe light 124 is used during this procedure. The camera is now opened, and the sensitized plate exposed for the desired period, after which it is developed and used in the usual manner.

While we have described herein one embodiment of our invention we wish it to be understood that we do not intend to limit ourselves thereby except within the scope of the appended claims.

We claim as our invention:

1. In photographic apparatus, a pair of tracks, a carriage, means mounting said carriage for movement longitudinally of said tracks, guide members mounted on said carriage extending transversely of said tracks, a panel mounted between said guide members, means to support a photographic subject on said panel, an auxiliary carriage mounted on said guide members for movement transversely of said tracks across the face of said panel, said auxiliary carriage including shielded illuminating members for said panel, a motor mounted on said auxiliary carriage, means driven by said motor to cause the carriage to move across the face of the panel, and motor reversing means operable by movement of said carriage, said auxiliary carriage including shielded illuminating members spaced apart to provide a vertically extending gap therebetween, the edges of said members being spaced from said panel to clear said subject but close enough to keep the stray light around the edges of said members below the minimum required for photographic reproduction, a spring roller shade mounted at one edge of said gap, and holding means connected to said shade for drawing the shade across the gap to reduce the size of said gap.

2. In photographic apparatus, a pair of tracks, a carriage, means mounting said carriage for movement longitudinally of said tracks, guide members mounted on said carriage extending transversely of said tracks, a panel mounted between said guide members, means to hold a photographic subject on said panel, an auxiliary carriage mounted on said guide members for movement transversely of said tracks across the face of said panel, said auxiliary carriage comprising vertically extending curved reflecting members with their concave sides turned towards the panel, the outer edges of said curved reflecting members being spaced from said panel to clear said subject mounted thereon, but close enough to said panel to keep the stray light below the minimum required for photographic reproduction to prevent fogging and vapor lamps extending vertically arranged within said concave reflecting members, a motor mounted on said auxiliary carriage, and means driven by said motor to cause the carriage to move across the face of the panel.

3. In photographic apparatus, a pair of tracks, a carriage, means mounting said carriage for movement longitudinally of said tracks, guide members mounted on said carriage extending transversely of said tracks, a panel mounted between said guide members, means to hold a photographic subject on said panel, an auxiliary carriage mounted on said guide members for movement transversely of said tracks across the face of said panel, said auxiliary carriage comprising vertically extending curved reflecting members with their concave sides turned towards the panel, and vapor lamps extending vertically arranged within said concave reflecting members, the outer edges of said curved reflecting members being spaced from said panel to clear said subject mounted thereon, but close enough to said panel to keep the stray light below the minimum required for photographic reproduction to prevent fogging, a motor mounted on said auxiliary carriage, and means driven by said motor to cause the carriage to move across the face of the panel, said reflecting members being spaced apart to provide a vertically extending gap therebetween, spring roller shades mounted at the edges of said gap, and holding means connected to said shades for drawing the shades towards each other to reduce the size of the gap.

4. In photographic apparatus, a pair of tracks, a carriage, means mounting said carriage for movement longitudinally of said tracks, guide members mounted on said carriage extending transversely of said tracks, a panel mounted between said guide members, means to hold a photographic subject on said panel, an auxiliary carriage mounted on said guide members for movement transversely of said tracks across the face of said panel, said auxiliary carriage comprising vertically extending curved reflecting members with their concave sides turned towards the panel, and vapor lamps extending vertically arranged within said concave reflecting members, a motor mounted on said auxiliary carriage, means driven by said motor to cause the carriage to move across the face of the panel, motor reversing means operable by movement of said carriage, said reflecting members being spaced apart to provide vertically extending gap therebetween, spring roller shades mounted in the edges of said gap, and frictionally restrained holding means connected to said shades for drawing the shades towards each other to reduce the size of said gap.

5. In a device as claimed in claim 4, a remote control switch stationary with respect to said tracks for controlling said auxiliary carriage motor, and means including rails carried by said tracks and shoes carried by said first carriage and engaging said rails for connecting said switch to said motor for controlling the movement of said auxiliary carriage.

6. In photographic apparatus, a pair of tracks, a carriage, means mounting said carriage for movement longitudinally of said tracks, guide members mounted on said carriage extending transversely of said tracks, a panel mounted between said guide members, means to support a photographic subject on said panel, an auxiliary carriage mounted on said guide members for movement transversely of said tracks across the face of said panel, said auxiliary carriage including illuminating means for said panel, a motor mounted on said auxiliary carriage, means driven by said motor to cause the carriage to move across the face of the panel, and motor reversing means operable by movement of said carriage, a remote control switch stationary with respect to said tracks for controlling said auxiliary carriage motor, and means including rails carried by said tracks and shoes carried by said first carriage and engaging said rails for connecting said switch to said motor for controlling the movement of said auxiliary carriage.

HERMAN G. KLEMM.
CHARLES H. NILES.